United States Patent

[11] 3,592,056

| [72] | Inventor | Jean Bernaix<br>Saint-Mande, France |
|---|---|---|
| [21] | Appl. No. | 706,436 |
| [22] | Filed | Feb. 19, 1968 |
| [45] | Patented | July 13, 1971 |
| [73] | Assignee | Coyne et Bellier, Bureau d'Ingenieurs Conseils<br>Paris, France |
| [32] | Priority | Feb. 20, 1967 |
| [33] | | France |
| [31] | | 95 601 |

[54] PROCESS FOR MEASURING THE PRESSURE AND/OR RATE OF FLOW OF INTERSTITIAL FLUID IN A PERMEABLE MEDIUM
12 Claims, 9 Drawing Figs.

[52] U.S. Cl. ..................................................... 73/194, 73/155
[51] Int. Cl. ........................................................ G01p 5/00
[50] Field of Search ............................................ 73/155, 194

[56] References Cited
UNITED STATES PATENTS
2,218,155  10/1940  Rusler et al. ................... 73/155
FOREIGN PATENTS
49,349  2/1939  France ................. 73/155

Primary Examiner—Richard C. Queisser
Assistant Examiner—John K. Lunsford
Attorney—Stevens, Davis, Miller & Mosher ABSTRACT: A process for measuring the pressure and/or rate of flow of interstitial fluid in a permeable medium, such as porous or fissured rock, comprising lining the wall of an elongated cavity in the medium with a flexible membrane, creating a pressure within the membrane exceeding the pressure of the interstitial fluid in order to apply the membrane against the wall of the cavity, isolating a short portion of the length of the interior of the membrane, varying the pressure in this short portion and measuring the results. A device for carrying out this process is also described.

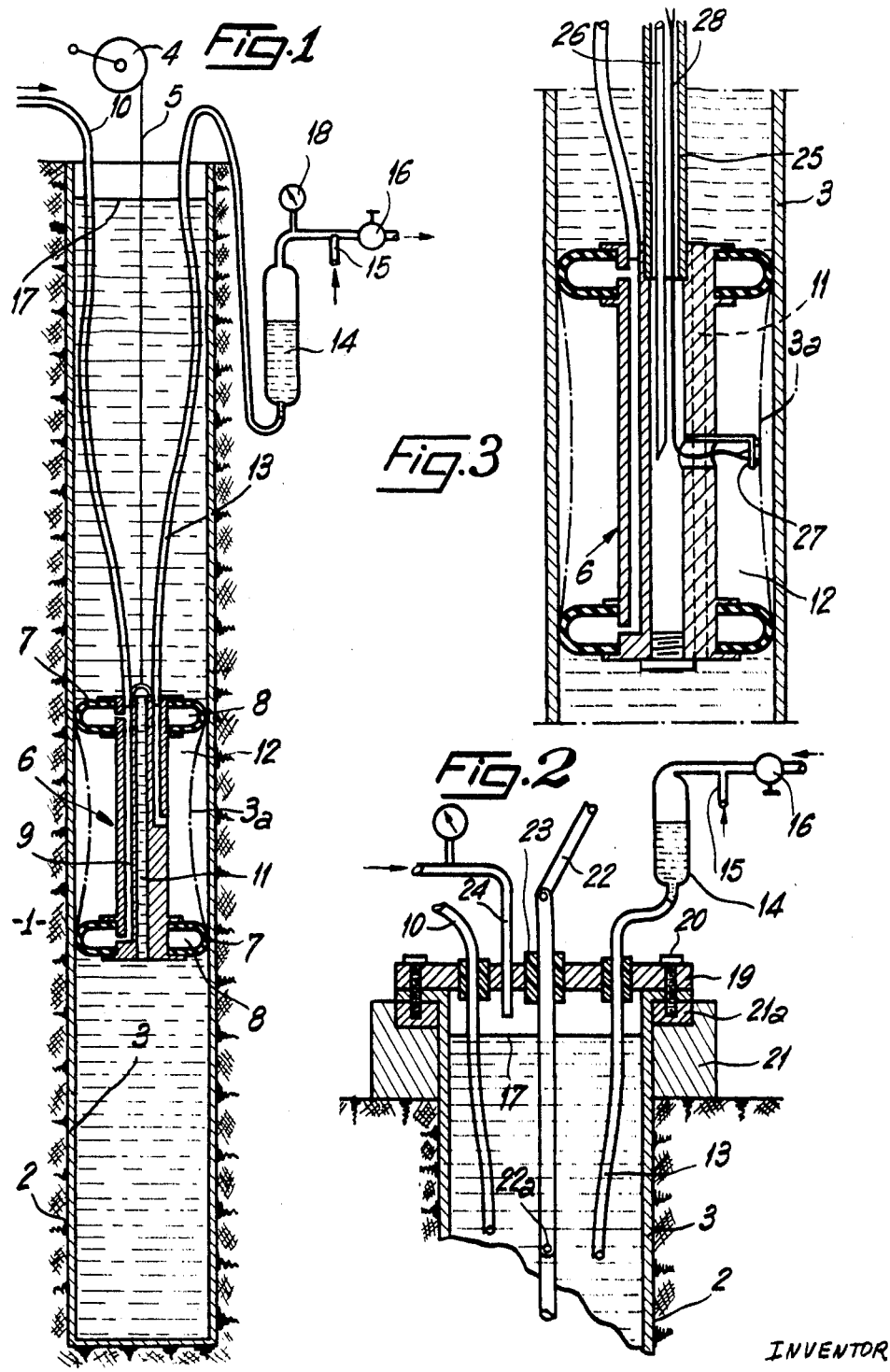

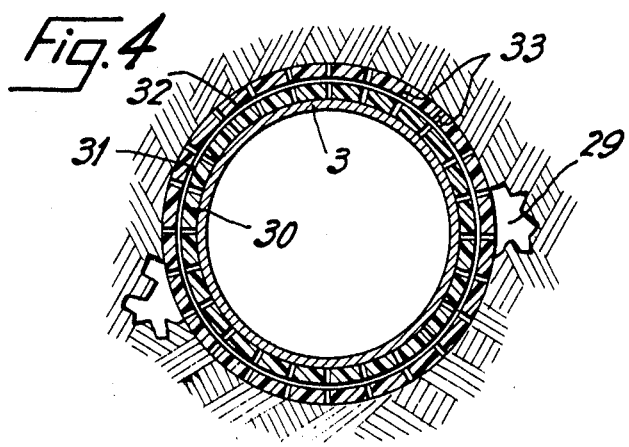
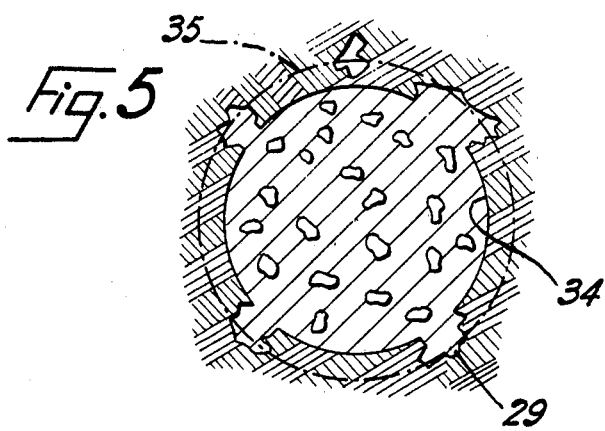
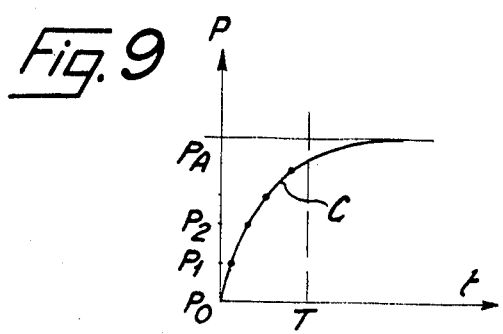

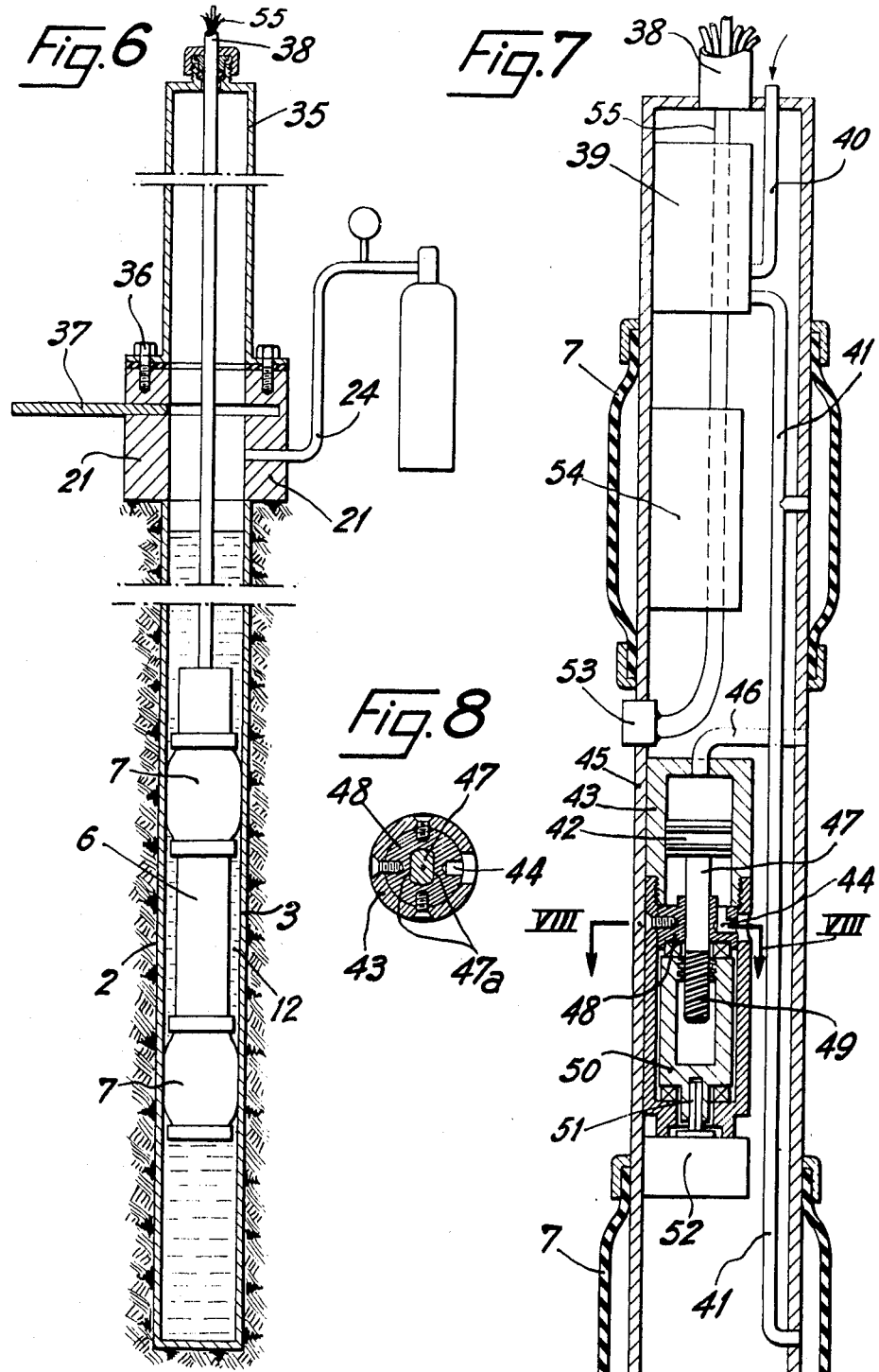

PROCESS FOR MEASURING THE PRESSURE AND/OR RATE OF FLOW OF INTERSTITIAL FLUID IN A PERMEABLE MEDIUM

This invention relates to a process and to a device for measuring the local pressure and/or rate of flow of a fluid enclosed in the interstices of a permeable medium, for example a porous or fissured medium. This medium may be, for example, a massive rock, or else natural soil or filling, or again a mass of masonry or of concrete.

The fluid whose pressure is to be measured is, in general, water but may also be another liquid or a gas.

The process according to the invention comprises the steps of lining the wall of an elongated cavity in the medium with a flexible membrane, causing a pressure to prevail in this membrane which is everywhere greater than the pressure of the interstitial fluid in the surrounding medium so as to apply the said membrane against the wall of said cavity, then isolating by means of obturators a short portion of the length of the internal space of this membrane, and finally causing a variation of the pressure in said short portion and measuring the results.

If, for example, the pressure in the said short portion is reduced progressively, at the instant when, in the isolated portion, the membrane ceases to be pressed against the wall of the cavity, the internal pressure has become equal to the external pressure, i.e. that of the fluid to be measured.

In another embodiment of the invention, an abrupt decrease of the pressure is brought about in said short portion and the increase in pressure which is then produced therein by the afflux of the external fluid is registered; in this way knowledge may be obtained of the pressure of this interstitial fluid and of its rate of flow at the level of the cavity.

Thus, there are two features of this invention: (1) By making a pressure measurement just at the instant when the separating movement of the membrane from the wall of the cavity begins, it is possible to determine the static pressure of the fluid; and (2) By allowing a sufficiently large deformation of the membrane, it is possible to estimate the speed of this deformation and, as a consequence, the possible rate of flow of the fluid at the level of the portion of the medium being studied.

By varying, along the length of the cavity, the position of the isolated portions, it is possible to measure the pressure and the rate of fluid flow in succession at all points along the length of the cavity.

In addition to its convenience and its precision, the process according to the invention has the advantage that the presence of the cavity, does not disturb the flow network of the fluid in the medium being studied, since the membrane which is applied firmly against the wall of the cavity prevents all circulation of the fluid from the wall of the cavity.

According to a preferred embodiment of the invention, the cavity is formed as a cylindrical boring, so that the membrane may be a thin-walled tube of diameter substantially equal to that of the boring. This tube may be made of flexible and possibly elastic material and, in particular, may be a tube of rubber or other elastomeric material reinforced by one or more helical steel wires. In this embodiment, in order to isolate internally a section of the tube, there may be used a pair of obturators having a periphery which is inflatable or distendible, by pressure or by mechanical means. These obturators are rigidly assembled together, in parallel spaced relationship, to form a kind of bobbin, which can be displaced with the aid of mechanical means along the tube.

Since the medium to be studied is porous or fissured, the wall of the boring either may be lacking in strength or may have irregularities, such as veins or cavities (geodes in the rocks) traversed by the boring, which may cause a bursting or tearing of the membrane. In this case, the wall of the boring advantageously is lined by a tube having small extensibility and a finely perforated wall which supports the external surface of the membrane, without preventing the interstitial fluid acting upon the latter.

The invention will now be described in greater detail, by way of example, with reference to the accompanying drawings in which FIG. 1 is a schematic vertical sectional view of apparatus employed in a first embodiment of the process according to the invention, FIG. 2 is a partial vertical sectional view illustrating another embodiment of apparatus for carrying out the process according to the invention, FIG. 3 is a partial vertical sectional view illustrating a modified embodiment of apparatus which may be employed when the pressure of the interstitial fluid is very weak, FIG. 4 is a transverse section, on an enlarged scale, of one embodiment of a supported membrane for use in carrying out the invention, FIG. 5 shows schematically one embodiment of a boring in a rock presenting numerous geodes, FIG. 6 is a schematic vertical sectional view of another embodiment of apparatus for carrying out the process according to the invention, FIG. 7 is a section, on an enlarged scale, of part of the apparatus shown in FIG. 6, FIG. 8 is a section taken along the line VIII-VIII of FIG. 7, and FIG. 9 is a diagram showing the results obtained with the apparatus shown in FIGS. 6,7 and 8.

In FIG. 1, there is shown a downwardly extending boring 2 in a rock 1. This boring is lined with a membrane 3 formed of a tube of flexible material, which is filled with liquid. This liquid may be water or, if the interstitial pressures are high, may be a liquid which is heavier than water. This liquid exerts an hydrostatic pressure against the wall of the boring, through the membrane 3, which pressure, by hypothesis, is greater than the pressure of the interstitial fluid contained in the pores or fissures of the rock 1.

By means of a winch 4 and a cable 5, movable equipment 6 in the form of a bobbin may be operated in the interior of the tubular membrane. This movable equipment comprises at each of its ends a sealing gasket 7 enclosing an annular chamber 8 which may be placed under pressure via channels 9 inside the bobbin and a tube 10 fed with fluid under pressure, for example, compressed air.

When the sealing gaskets 7 are deflated, the mobile equipment 6 may move freely in the tubular membrane owing to the existence of a communicating channel 11 which traverses the equipment, whereas when pressure is applied to the tube 10, an annular portion 12 of the volume defined by the tubular membrane is isolated. This isolated portion 12 communicates via a channel 13 with a liquid level device 14 above which a pressure of compressed gas can be maintained via a channel 15, which pressure is indicated by a pressure gauge 18 and can be decreased progressively by means of a manual pressure regulator 16.

The liquid in the device 14 is the same as that in the membrane 3, i.e. usually water, and therefore the liquid level in the device 14 will be, as shown, at a lower level than the upper level 17 of the liquid in the tubular membrane, in order to compensate for the pressure difference caused by the positive gas pressure above the level device 14.

When a portion 12 has been isolated by the sealing gaskets 7, the manual pressure regulator 16 is operated in order to reduce progressively the pressure in the portion 12. At the time of this pressure reduction, initially the level of the liquid in the device 14 remains stationary, or else rises slowly, as a consequence of the elastic contraction of the device 6. When the pressure in the interior of the portion 12 becomes equal to the pressure of the external fluid, the portion of the membrane comprised between the two sealing gaskets 7 tends to take up the position 3a represented in chain lines. As a result there is an abrupt increase of the level of the liquid in the device 14. The hydrostatic pressure, i.e. the difference of the readings between the level of the liquid in the device 14 and the mobile equipment 6, increased by the pressure of the gas read on the pressure gauge 18, gives the value of the pressure of the interstitial fluid.

In order to avoid having to install the device 14 below the liquid level 17, which is not always possible, the membrane 3 may be closed at its upper end, as shown in FIG. 2, by a sealing cover 19. The cover 19 grips the edge of the membrane against, for example, an extension 21 of the boring 2 by means of screws 20. The cable 5 shown in FIG. 1 is then replaced by a series of rods 22 assembled together by screw-threaded sleeves of the same diameter as these rods, or by hinges 22a which do not necessitate any increase in the cross-sectional area of the rods in order to enable them to traverse successively the sealing gasket 23. Sealing gaskets are also provided for the passage of the tubes 10 and 13, whilst the gas space situated above the level 17 is maintained under pressure by a constant pressure gas supply 24.

The device of FIG. 2 should also be employed when, owing to the boring being very inclined or even ascending, the hydrostatic pressure inside the membrane is insufficient for the purpose of applying the membrane firmly against the wall of the boring.

The devices illustrated in FIGS. 1 and 2 are only suitable if the difference in pressure head between the free extremity of the boring and the equipment 6 is always less than the pressure head corresponding to the pressure to be measured. If this is not the case, the device shown in FIG. 3 may be used, which is intended to bring the pressure in the isolated portion 12 below the value corresponding to the difference in pressure head between the free end of the boring and the movable equipment 6.

In this case, the movable equipment 6 is operated by means of an axial tube 25 which opens into the portion 12 and which contains an auxiliary tube 26 enabling the contents of the portion 12 to be sucked up. If the sucking up is effected at a constant rate, in order to vary linearly the liquid head over the mobile equipment 6, and if, at the same time, the pressure in the portion 12 is recorded, a disturbance will appear in this recording when the membrane 3 takes up the position 3a in the portion 12.

It is also possible, as shown, to detect the instant at which the displacement of the membrane occurs by means of, for example, feelers 27 comprising electrical contacts, the conductors 28 to which pass through the tube 25. If it is found that electric contacts reduce the sensitivity, these may be replaced by an inductive or capacitive comparator.

FIGS. 6 and 7 shows another embodiment of the invention. In this embodiment a sleeve 35, secured by bolts 36 and associated with an obturating vane 37, forms a lock chamber which permits at will the introduction of the device 6 into the boring without changing the pressure which is maintained therein by the compressed air inlet 24.

The device 6 is operated by a cable 38 which traverses in a sealing manner the closed end of the sleeve 35. This cable has a steel core which acts as a support for the device 6 and has conductors 55 at its periphery which serve to supply the motors described hereinafter, to supply signals of predetermined frequency for the sequential control of these motors, and for the transmission of information.

The cable 38 may be operated by a winch (not shown). The conductors 55 may be connected to external circuits by a plug and socket-type connector which would have to be separated each time the winch is operated.

The sealing gaskets 7 are inflated by a motorized pump 39 which withdraws the necessary water from the boring via a pipe 40 and delivers it to the gaskets via piping 41. Electrically controlled valves (not shown) may be provided in the pipes 40 and 41; the control of these valves is ensured by an order receiver 54 which comprises essentially oscillating circuits tuned to the order frequencies and control relays.

Variation of the pressure in the annular portion 12 is obtained by means of a piston 42. The latter is movable in a cylinder 43, one compartment of which communicates with the portion 12 via a conduit 44 and the other compartment of which communicates with the interior of a tube 45 via an orifice 44. The tube 45 encloses the assembly of members of the device and remains full of air substantially at atmospheric pressure.

The rod 47 of the piston 42 has two flats 47a and traverses a guide 48 provided with an opening of corresponding section, so that turning of the rod is prevented. This rod is provided with a screw thread 49 engaged in a nut 50 which is prevented from axial displacement and which may be rotated by a reversible motor 52 via a drive coupling 51.

Thus, if the motor 52 is started in order to move the piston 42 from its upper position to its lower position, an abrupt decrease of the pressure in the annular portion 12 is caused and the membrane 3 separates from the wall of the boring 2.

The initial pressure $P_o$ (FIG. 9) thus obtained is measured by a pressure-measuring device 53. As the interstitial liquid flows through the fissures in the rock, the device 53 enables the pressures $P_1$, $P_2$.... to be recorded at the end of the successive times $t_1$, $t_2$... so that the curve C can be traced.

The equilibrium pressure $P_A$, i.e. the pressure of the interstitial fluid to be measured may only appear, if the flow is weak, at the end of a relatively long time.

However, as the volume of the annular portion 12 and the variation of this volume, due to the displacement of the piston 42, are always similar, experience shows that the curves C are also similar, which enables the measurement to be stopped at the time T and the value of $P_A$ to be deduced by extrapolation.

The slope of the curve C at the origin is, in addition, a measure of the rate of flow of the interstitial liquid.

When the medium to be studied is a fissured rock which includes geodes, such as 29 (FIG. 4), exhibiting sharp crystals, the use of a simple membrane, such as the membrane 3, can no longer be contemplated. In order to protect the membrane the arrangement shown in FIG. 4 may be utilized.

The internal membrane 3 is enclosed in a tube 30, which may be made of an elastomer such as neoprene, or of a fabric, which tube is reinforced with metallic rings 31 or with a continuous helix of metal wire. On this tube 30 there is applied a layer 32 of rubber or other very flexible elastomer, intended to be applied against the wall of the boring in order to avoid circulations between the isolated portion and the external liquid. The tube 30 and the covering layer 32 are pierced with a plurality of small radial borings 33 which permit the external fluid to act on the membrane 3.

When, as shown in FIG. 5, the drilled rock comprises numerous geodes 29, a first boring 34 may be made which is then filled by injection of mortar (under low pressure so as not to clog the fissures in the rock). Finally, a second boring 35 of greater diameter than the first is produced, the first boring 34 serving as a guide during formation of the second boring, which process is well known in the art of boring. As will be seen from a consideration of the Figure, the importance of the geodes and their influence on the holding of the membrane can in this way be considerably limited.

After their installation in a boring, the membranes may be left there in order to permit periodic measuring operations. If necessary, the mobile equipment 6 may also be left in place.

It will, of course, be appreciated that the invention is not limited to the process and apparatus described above with reference to the drawings, but that modifications may be made within the scope of the ensuing claims.

What I claim:

1. A process for measuring the pressure and/or rate of flow of interstitial fluid in a permeable medium, comprising the steps of lining the wall of an elongated cavity in the medium with a flexible membrane, causing a pressure to prevail in this membrane which is everywhere greater than the pressure of the interstitial fluid in the surrounding medium so as to apply the said membrane against the wall of said cavity, then isolating by means of obturators a short portion of the length of the internal space of this membrane, and finally causing a variation of pressure in said short portion and measuring the results.

2. The process claimed in claim 1, in which the cavity is a cylindrical boring and the membrane used is tubular.

3. The process claimed in claim 2, in which said membrane is surrounded by a perforated resistant envelope.

4. The process claimed in claim 1, in which the membrane used is a tube of flexible rubber reinforced with turns of metal wire.

5. The process claimed in claim 1, in which the pressure in said isolated portion is progressively reduced in order to cause a separation of the membrane from the wall of the cavity.

6. The process claimed in claim 1, in which an abrupt increase of the volume of said isolated portion is caused, so as to lead to an abrupt drop of the pressure in this portion, after which the subsequent rise in pressure produced in said portion is recorded.

7. A device for measuring the pressure and rate of flow of interstitial fluid in a permeable medium, comprising a rigid tubular element movable in the interior of a tubular membrane, a flexible obturator surrounding each end of the tubular element, means for inflating said obturators and means for varying the pressure in the annular space formed around said tubular member and between obturators when the device is placed in the tubular membrane.

8. The device claimed in claim 7, in which said pressure-varying means comprises means for decreasing the pressure slowly and progressively in the annular space, and in which a conduit connects said annular space to a pressure-indicating means.

9. The device claimed in claim 7, in which said pressure-varying means comprises means for decreasing the pressure slowly and progressively in the annular space, and in which detection means is disposed in the annular space for detecting movement of the membrane towards said rigid tubular element.

10. The device claimed in claim 7, in which said inflation means comprises a pump inside said tubular element, which pump is arranged to draw liquid from the interior of the tubular membrane outside said annular space and to deliver it into the obturators.

11. The device claimed in claim 7, in which said pressure-varying means comprises a space of variable volume which communicates with said annular space and with the interior of said rigid tubular element.

12. The device claimed in claim 11, comprising a cylinder and a piston movable in the cylinder, said space of variable volume being constituted by a first compartment in the cylinder on one side of the piston, and the compartment in the cylinder on the other side of the piston communicating with the interior of the tubular element.